US010201924B2

(12) United States Patent
Grabe (10) Patent No.: US 10,201,924 B2
(45) Date of Patent: Feb. 12, 2019

(54) HIGH-MOLECULAR POLYSILANE AND METHOD FOR THE PRODUCTION THEREOF FOR PRODUCING PRE-CERAMIC MOLDED BODIES

(71) Applicant: BJS CERAMICS GMBH, Gersthofen (DE)

(72) Inventor: Norman Grabe, Augsburg (DE)

(73) Assignee: BJS Ceramics GmbH, Gersthofen (DE)

( * ) Notice: Subject to any disclaimer, the term of this patent is extended or adjusted under 35 U.S.C. 154(b) by 0 days.

(21) Appl. No.: 15/911,670

(22) Filed: Mar. 5, 2018

(65) Prior Publication Data

US 2018/0200939 A1 Jul. 19, 2018

Related U.S. Application Data

(60) Division of application No. 14/739,489, filed on Jun. 15, 2015, which is a continuation of application No. PCT/EP2013/076346, filed on Dec. 12, 2013.

(30) Foreign Application Priority Data

Dec. 14, 2012 (DE) ........................ 10 2012 223 260

(51) Int. Cl.
*C08G 77/60* (2006.01)
*B29C 47/00* (2006.01)
(Continued)

(52) U.S. Cl.
CPC ........ *B29C 47/0014* (2013.01); *C01B 32/956* (2017.08); *C04B 35/571* (2013.01);
(Continued)

(58) Field of Classification Search
None
See application file for complete search history.

(56) References Cited

U.S. PATENT DOCUMENTS

| 5,091,485 A | 2/1992 | Noireaux et al. |
| 7,153,990 B2 | 12/2006 | Knies et al. |
| 2007/0078252 A1* | 4/2007 | Dioumaev ............. C08G 77/60 528/31 |

FOREIGN PATENT DOCUMENTS

| DE | 10 2004 052 423 A1 | 5/2006 |
| JP | 2000239391 A | 9/2000 |

(Continued)

OTHER PUBLICATIONS

Robert D. Miller et al: "Polysilane high polymers", Chemical Reviews, vol. 89, No. 6, Sep. 1, 1989 (Sep. 1, 1989) pp. 1359-1410, XP055012452, ISSN: 0009-2665, DOI: 10.1021/cr00096a006.

*Primary Examiner* — Guinever S Gregorio
(74) *Attorney, Agent, or Firm* — Laurence A. Greenberg; Werner H. Stemer; Ralph E. Locher (57) ABSTRACT

A method produces a polysilane by reacting at least two silane monomers and at least one alkali metal. The silane monomers have the following structural units: at least one aryl group, at least one alkyl group, at least one alkenyl group, and at least three halogen atoms. Wherein at least three of the halogen atoms are bonded to a silicon atom of one of the silane monomers, and the reaction step takes place in an ether-containing solvent, particularly preferably dioxane. The obtained polysilane has a high molecular mass and, at 100° C., a viscosity of 1,500 to 3,000 Pa·s. The polysilane is very suitable for being processed to form silicon carbide fibers and fiber composites.

10 Claims, 3 Drawing Sheets

(51) Int. Cl.
 *C04B 35/571*    (2006.01)
 *C04B 35/626*    (2006.01)
 *C04B 35/80*     (2006.01)
 *C08G 77/02*     (2006.01)
 *C01B 32/956*    (2017.01)
 C08G 77/00       (2006.01)
 B29K 85/00       (2006.01)

(52) U.S. Cl.
 CPC ........ C04B 35/6267 (2013.01); C04B 35/806 (2013.01); C08G 77/02 (2013.01); C08G 77/60 (2013.01); B29K 2085/00 (2013.01); C04B 2235/483 (2013.01); C04B 2235/5216 (2013.01); C04B 2235/5244 (2013.01); C04B 2235/5264 (2013.01); C04B 2235/616 (2013.01); C08G 77/80 (2013.01)

(56) References Cited

FOREIGN PATENT DOCUMENTS

| | | |
|---|---|---|
| JP | 2001220445 A | 8/2001 |
| JP | 2006316197 A | 11/2006 |
| JP | 2011162792 A | 8/2011 |

\* cited by examiner

FIG. 3

HIGH-MOLECULAR POLYSILANE AND METHOD FOR THE PRODUCTION THEREOF FOR PRODUCING PRE-CERAMIC MOLDED BODIES

CROSS-REFERENCE TO RELATED APPLICATION

This is a divisional of patent application No. U.S. Ser. No. 14/739,489, filed Jun. 15, 2015, which was a continuation, under 35 U.S.C. § 120, of international application No. PCT/EP2013/076346, filed Dec. 12, 2013, which designated the United States; this application also claims the priority, under 35 U.S.C. § 119, of German patent application No. DE 10 2012 223 260.5, filed Dec. 14, 2012; the prior applications are herewith incorporated by reference in their entireties.

BACKGROUND OF THE INVENTION

Field of the Invention

The present invention relates to a high-molecular polysilane, to a method for the production thereof, to a polymer fiber produced from the polysilane, to a silicon carbide fiber produced therefrom, to a fiber composite material produced from the fiber, to silicon carbide ceramics produced therefrom and to the use of the produced products.

Because of the hardness, temperature resistance, stability and semiconductor properties thereof, silicon-carbide-containing ceramic components and composite materials have a wide range of applications in the semiconductor industry, in electrical engineering, in medical technology, in vehicle and aircraft construction and in space travel.

On an industrial scale, silicon-carbide-containing ceramic components and composite materials are produced by producing a polysilane, which is spun to form fibers by melt spinning. The fibers are subsequently cured and pyrolysed to form ceramic silicon carbide fibers, which can subsequently be processed further to form ceramic components or composite materials.

The polysilane is produced by way of a Wurtz coupling, in which an organohalogen silane, such as dichloromethylsilane, is converted to a polydimethylsilane in presence of molten sodium.

However, a drawback of the above-described production method is the low yield of polysilane and the low molecular weight thereof. However, a high molecular weight is a prerequisite for further processing by melt spinning and for a high yield of fibers. Further, this production method results in the silicon carbide fibers having a high proportion of free carbon. This is excess carbon which is unbound within the obtained silicon carbide. However, the excess carbon combusts easily at higher temperatures to form carbon monoxide and carbon dioxide during further processing or during use. To reduce the proportion of this free carbon in silicon carbide materials, it has previously been proposed to add a sintering additive, such as aluminum or boron, to the polysilane prior to the pyrolysis, or to anneal the silicon carbide after the pyrolysis. However, these methods are expensive. While the first variant including a sintering additive requires a two-stage pyrolysis instead of a one-stage pyrolysis, involving additional material costs because of the addition of a sintering additive, the second variant requires an additional work step in the form of an annealing step.

In addition, subsequent annealing leads to a material having a comparatively high porosity and to defects which lower the mechanical stability of the fibers and can make the material unusable for the spinning process. A further drawback is that, if these methods are used prior to the spinning and prior to the pyrolysis, the polysilane initially has to be converted to a polycarbosilane, and this requires a separate work step and the preparation of a suitable reactor. For these reasons, both of these variants require considerable outlay in terms of technology, time and staff. There is therefore a need for a method which can produce a silicon carbide having a virtually stoichiometric ratio of silicon to carbon, in other words a ratio of silicon to carbon as close as possible to 1, without additional work steps.

U.S. Pat. No. 5,091,485 describes a method for the production of polysilanes which can be converted to silicon carbide by heat treatment. In this method, at least one silane monomer having formula $R^1R^2SiCl_2$, in which $R^1$ is a hydrogen atom or a hydrocarbon functional group and $R^2$ is a vinyl functional group, is reacted with at least one monochlorinated co-monomer in the presence of molten sodium in an organic solvent to form a polysilane. In this context, an organic compound, such as a benzyl chloride or an organosilane having formula $R^1{}_3SiCl$, in which $R^1$ may be a hydrogen atom or a hydrocarbon functional group, may be used as the monochlorinated co-monomer. However, this method has the drawback that the polysilanes obtained have a relatively low molar mass, and are therefore liquid at room temperature. Therefore, the polysilanes obtained have poor workability prior to the conversion to silicon carbide. In particular, it is not possible, or only possible with unsatisfactory results, to spin these polysilanes to form fibers and thus subsequently to convert them to silicon carbide fibers. Aside from this, in the method described in this document, a comparatively high proportion of insoluble polysilanes occurs. These insoluble polysilanes are separated out during the workup and purification steps, which are required prior to the conversion to silicon carbide so as to achieve as pure a polysilane as possible as a starting material, and this considerably reduces the reaction yield. For example, products which occur during the reaction and accumulate as a solid, such as sodium chloride, have to be separated out by filtration. The insoluble polysilane contents remain in the filter cake, while the soluble polysilane contents are in solution in the filtrate. Thus, merely the soluble polysilane content found in the filtrate can be isolated and provided for further use, since any conceivable isolation of the insoluble content from the filter cake would involve too many additional work steps and an increased expenditures in terms of technology, time and staff.

SUMMARY OF THE INVENTION

Therefore, the object of the present invention is to provide a polysilane and a simple, rapid and cost-effective method having a high yield of soluble polysilane for the production thereof, the polysilane having a high molecular weight and simultaneously having a virtually stoichiometric one-to-one ratio of silicon to carbon, in such a way that the polysilane can better be spun to form fibers and processed to form fiber composite materials and ceramics.

According to the invention, the object is achieved by a method for producing a polysilane containing the step of reacting (i) at least two silane monomers and (ii) at least one alkali metal, the silane monomers containing the following structural units:
at least one aryl group,
at least one alkyl group,
at least one alkenyl group, and at least three halogen atoms, at least three of the halogen atoms being bonded to a silicon atom of one of the silane monomers, characterized in that the step of reaction takes place in an ether-containing solvent.

As a result of reacting at least two silane monomers, which contain at least one aryl group, at least one alkyl group, at least one alkenyl group and at least three halogen atoms which are bonded to a silicon atom of one of the monomers, with an alkali metal by the present method, a polysilane is obtained which has a comparatively high molecular weight and simultaneously has a high proportion of polysilane which is soluble in organic solvents. In fact, this method in particular also leads to a polysilane which is converted to silicon carbide having a ratio of silicon to carbon close to the stoichiometric ratio of silicon carbide, in other words having a ratio of silicon to carbon close to 1, in a high yield in a subsequent pyrolysis, and which has excellent workability in particular for forming silicon carbide fibers. Further, the method according to the invention can also be carried out in a simple, rapid and cost-effective manner, since additional work steps, such as adding a sintering additive and/or a subsequent annealing step or afterburning, can be omitted, because surprisingly, even without these additional steps, the method according to the invention results in polysilane which at best has a low proportion of free carbon. As a consequence of omitting the removal of free carbon, the silicon carbide fibers obtained by spinning have extremely low porosity and excellent mechanical stability, since no defects are created therein by the removal of free carbon. In addition, no conversion to polycarbosilane is necessary either.

The reaction may take place in any ether-containing solvent. In this case, ether-containing means that the solvent contains at least 1% ether, but preferably contains more than 10%, more preferably more than 50%, even more preferably more than 75%, particularly preferably between 75 and 100%. Alternatively, it is preferred to set the proportion of ether to 60 to 95% of the solvent.

The ether has the basic formula $R^1$—O—$R^2$, in which $R^1$ and $R^2$ are preferably alkyl functional groups, aryl functional groups, connected in an open chain or cyclically. Accordingly, aliphatic ethers or aromatic ethers are preferably used, particularly preferably diphenyl ethers, dibenzyl ethers, most preferably methylphenyl ethers. From the group of aliphatic ethers, acyclic ethers are preferably used, particularly preferably dimethyl ethers, diethyl ethers, dipropyl ethers, t-butyl-methyl ethers or polyethers, preferably polyethylene glycol, or cyclic ethers, particularly preferably cyclic ethers. However, cyclic ethers are more preferred. Preferably, cyclic ethers containing an oxygen atom, preferably oxirane, pyran, dihydropyran or tetrahydrofuran, are used. Cyclic ethers which comprise at least two oxygen atoms having free electron pairs are particularly preferred, 1,4-dioxane (dioxane) being most preferred, or alicyclic ring ethers containing at least two oxygen atoms. A preferred ether containing three oxygen atoms is trioxane. Particularly preferred solvents are dimethyl ether, diethyl ether, dipropyl ether, t-butyl-methyl ether, anisol, diphenyl ether, dibenzyl ether, oxirane, tetrahydrofuran, 1,4-dioxane (dioxane), pyran or dihydropyran or mixtures thereof.

It is particularly preferred for the ether to contain at least two oxygen atoms. This increases the molecular weight of the product and the yield thereof.

Preferably, the reaction step takes place in a dioxane-containing solvent. Surprisingly, this brings about an enormous increase in the molecular weight of the product and simultaneously a large increase in the yield.

Even more preferably, 50 to 100%, preferably 80 to 100%, particularly preferably 100% dioxane is used as the solvent. This leads to even higher yields and an even higher molecular weight of the polysilane.

Although pure dioxane is preferred as the solvent, a co-solvent may also be used alongside dioxane.

In this context, the dioxane may be present in mixtures with at least one other solvent, preferably with 1 to 4 other solvents, most preferably with 2 other solvents.

In this context, preferred co-solvents are ethers, in particular the above-described ethers, aliphatic hydrocarbons or aromatic hydrocarbons; ethers or aromatic hydrocarbons are particularly preferred, particularly preferably tetrahydrofuran, dimethyl ether, diethyl ether, dipropyl ether, t-butyl-methyl ether, methylphenyl ether, diphenyl ether, dibenzyl ether, oxirane, pyran, dihydropyran and toluene, xylene or benzene. Xylene, methylphenyl ether, toluene and tetrahydrofuran are even more preferred. Xylene and methylphenyl ether are most preferred.

The preferred solvent combinations contribute greatly to increasing the molecular weight and the reaction yield. The use of dioxane as a component of the solvent is strongly correlated with the molecular weight of the product. The higher the dioxane concentration, the higher the molecular weight of the polysilane and the corresponding reaction yield.

In the reaction, all alkali metals may be used as the alkali metal, such as lithium, sodium, potassium, rubidium, caesium, francium and any combinations of two or more of the metals. However, it is preferred for sodium, potassium, a mixture of sodium and potassium or an alloy of sodium and potassium to be used in the reaction step. All of the metals may be used in liquid form, i.e. as a melt, or as a solid suspended in a solvent. However, it is preferred for the alkali metal to be used in liquid form, i.e. as a melt, the melt preferably being finely dispersed in an organic solvent using a suitable stirring device, such as a blade stirrer. In this embodiment, the alkali metal can be obtained particularly finely dispersed, and this is preferable to a coarsely dispersed form. It is particularly preferred for sodium, a mixture of sodium and potassium or an alloy of sodium and potassium to be used as the alkali metal.

An advantage of the use of a mixture or alloy of sodium and potassium is that the addition of the potassium lowers the melting point of the sodium, specifically to less than room temperature if an appropriate amount of potassium is added. Therefore, the use of a mixture or alloy of sodium and potassium makes it possible to use liquid alkali metal even at room temperature. In this embodiment, it is preferred for the mixture or alloy only to contain as little potassium as is required to reduce the melting point of sodium to a desired value, since, unlike sodium, potassium leads to undesired secondary reactions with the double bond of the alkenyl group during the reaction.

Particularly preferably, sodium is used exclusively as the alkali metal in the reaction.

It is likewise preferred for the alkali metal to be used in an excess of at least 10%, preferably 10 to 20%, particularly preferably 10% with respect to the amount of halogen in the educts. This leads to an increase in the molecular weight.

So as to increase the molecular weight of the polysilane and the yield even further, it is preferred for the alkali metal to be added step by step, preferably in at least 2 steps, more preferably in 3 steps and even more preferably in 4 or more steps in parallel with the addition of silane monomer to the reaction mixture. In this context, it should be assumed that the molecular weight increases as a function of the number of steps, because metering the alkali metal step by step reduces the available surface area of the alkali metal and thus leads to a higher level of polymerization. Therefore, the number of steps should be increased, in so far as this can be implemented in practice, depending on the test setup. Addition of alkali in up to four or fewer steps has been found to be practicable.

In particular, the yield and the molecular weight of the polysilane can be increased in that a reaction initiator is preferably used during the reaction step. Preferably, the reaction initiator is added together with the alkali metal, preferably pre-mixed in the flask, before the silane monomer (mixture) is added thereto. As a result of this measure, the alkali metal can pre-react with the reaction initiator in advance, and this both reduces the available surface area of the alkali metal and prevents termination reactions due to cyclization, and thus leads to a higher degree of polymerization. If the alkali metal is simultaneously metered in step by step, the molecular weight can be increased even further.

Preferably, the initiator contains the following structural units: a silicon atom, at least one halogen atom bonded to the silicon and at least two sterically hindering groups bonded to the silicon.

The bonded sterically demanding groups prevent the initiator molecule from reacting with another initiator molecule; this would detract from the reaction with the alkali metal and the subsequent polymerization. In this way, the molecular weight and the yield of polysilane are likewise increased. All conventional protective groups known to the person skilled in the art may be used as sterically hindering groups, such as tert-butyl functional groups, cycloalkyl functional groups, preferably cyclohexyl functional groups, other alkyl functional groups, which preferably comprise at least 4 carbon atoms and at least one branch point, aryl functional groups, mesityl functional groups or phenyl functional groups, preferably phenyl functional groups. The sterically hindering groups are configured in such a way that they themselves do not react with the alkali metal.

The functional groups of the sterically hindering groups are described in the following. If aryl functional groups are used, they may be an unsubstituted aryl group, such as the aforementioned phenyl group, or a substituted aryl group. In the latter case, the at least one aryl group may preferably be substituted with at least one functional group which is selected from the group consisting of linear alkyl functional groups, branched alkyl functional groups, cyclic alkyl functional groups, linear alkenyl functional groups, branched alkenyl functional groups, cyclic alkenyl functional groups, linear alkynyl functional groups, branched alkynyl functional groups, cyclic alkynyl radials and any desired combinations of two or more of the aforementioned functional groups. The aforementioned substituents may contain for example 1 to 25 carbon atoms, preferably 1 to 15 carbon atoms, more preferably 1 to 10 carbon atoms, particularly preferably 1 to 6 carbon atoms and most preferably 1 to 4 carbon atoms.

Merely by way of example, methyl functional groups, ethyl functional groups, n-propyl functional groups, isopropyl functional groups, n-butyl functional groups, sec-butyl functional groups, isobutyl functional groups, tert-butyl functional groups, vinyl functional groups, n-propenyl functional groups, isopropenyl functional groups, linear butenyl functional groups, branched butenyl functional groups, ethynyl functional groups, propynyl functional groups and butynyl functional groups may be mentioned as suitable substituents, and may be used alone or in any desired combination with one another. Methyl functional groups, ethyl functional groups, n-propyl functional groups, isopropyl functional groups, n-butyl functional groups, sec-butyl functional groups, isobutyl functional groups, tert-butyl functional groups and any desired combinations of two or more of the aforementioned functional groups are particularly preferred as a substituent, if one is used.

Although it is possible to use substituted aryl groups, according to the present invention it is particularly preferred to use unsubstituted aryl groups, such as in particular phenyl groups.

Preferably, the initiator contains 2 or 3 sterically hindering groups, particularly preferably 3 sterically hindering groups. It is preferred to use chlorine or bromine, particularly preferably chlorine, as a halogen atom. It is preferred for the initiator to contain exactly one halogen atom. Preferably, chlorotriphenylsilane is used as the initiator.

It is further preferred for 0.01 to 0.25 mol. % based on the silane monomers, more preferably 0.03 to 0.15 mol. %, even more preferably 0.06 to 0.1 mol. % of the initiator to be added to the alkali metal dispersion prior to the addition of the remaining silane monomers. The addition of the initiator in this concentration range leads in particular to an increase in the molecular weight and the yield. It is preferable to use an initiator, but only up to a concentration of 0.25 mol. %, since the use of a higher concentration of initiator reduces both the yield and the molecular weight of the polysilane.

Preferably, the silane proportion of the reaction mixture is between 5 and 50 vol. %, more preferably between 5 and 30 vol. % and even more preferably between 5 and 20 vol. %. A silane proportion of this approximate amount leads to an increase in the molecular weight of the polysilane. A higher amount of solvent would reduce the concentration of sodium and silane and lead to a reduction of the molecular weight. Without limitation to any one theory, it is believed that the use of a silane monomer containing at least one aryl group—in addition to silane monomer(s) which contain at least one alkenyl group, at least one alkyl group and at least three halogen atoms bonded to a silicon atom—in the reaction with the alkali metal leads to polysilane having improved workability and in particular having improved spinnability to form a polysilane fiber. Surprisingly, when a silane monomer containing (an) aryl group(s) is used—if silane monomer(s) containing at least one alkenyl group, at least one alkyl group and at least three halogen atoms bonded to a silicon atom is/are simultaneously used—polysilane is obtained which after pyrolysis leads to silicon carbide having a silicon-carbon ratio close to the stoichiometric ratio of 1, in spite of the silicon-carbon ratio of this silane monomer being low because of the aryl group. A favorable influence on the workability of the polysilane obtained may also be ascribed to the at least one alkenyl group. In addition, this group increases the yield of silicon carbide in the subsequent pyrolysis, and this is presumably because the alkenyl group promotes cross-linking of the polysilane during the pyrolysis. Further, during the pyrolysis of alkenyl groups, free carbon which is not covalently bonded in the silicon carbide, and which would lead to a silicon-carbon ratio reduced from the stoichiometric ratio, does not occur or occurs to a lesser extent. In addition, the silane monomer containing three halogen atoms bonded to a silicon atom takes on major significance for the workability and in particular for excellent pyrolysability of the produced polysilane. It is assumed that the trifunctionality of this monomer prevents the formation of low-molecular cyclic silane, which would evaporate during the subsequent pyrolysis because of the low boiling point thereof, leading to cavities in the material and to a loss of yield in the pyrolysis. Finally, the alkyl groups serve as cost-effective substituents which are easy to provide and which promote the formation of a virtually stoichiometric silicon-carbon ratio in the pyrolysis of the polysilane.

Within the meaning of the present invention, polysilane means any silane which contains at least 5, preferably at least 10 and particularly preferably at least 20 interconnected silicon atoms.

Within the meaning of the present invention, silane monomer is understood to mean all silanes which are not polysilanes, in other words silanes which contain fewer than 5 silicon atoms, preferably at most 3 silicon atoms, particularly preferably at most 2 silicon atoms and most preferably merely one silicon atom.

According to the invention, in the method for producing the polysilane, at least two silane monomers are used, which contain at least one aryl group, at least one alkyl group, at least one alkenyl group and at least three halogen atoms bonded to a silicon atom as structural units. The individual aforementioned groups may be distributed in any desired manner on the two or more silane monomers used. For example, four silane monomers may be used, which each contain one of the four aforementioned structural units. Alternatively, three or even merely two silane monomers may be used, of which two or three each contain at least two of the four aforementioned structural units. Preferably, not only the three halogen atoms but also each of the other aforementioned structural units, in other words the at least one aryl group, the at least one alkyl group and the at least one alkenyl group, is bonded directly to a silicon atom of the corresponding silane monomer.

In principle, it is also possible for individual groups of the silane monomers to contain two or even more of the four aforementioned structural units. In this connection, merely by way of example, a styryl group may be mentioned, which contains both an alkenyl group and an aryl group. In such a case, the group accordingly performs a plurality of the at least four aforementioned criteria, i.e. in the case of a styryl group the two criteria for the presence of at least one aryl group and the presence of at least one alkenyl group. In a case of this type, the at least two silane monomers thus contain fewer than four different functional groups.

In principle, in the method according to the invention, one or more silane monomers containing any one or more aryl groups may be used. However, good results are achieved in particular if the silane monomers used in the reaction comprise at least a $C_{4-25}$ aryl group, preferably a $C_{6-18}$ aryl group, more preferably a $C_{6-14}$ aryl group, particularly preferably a $C_{6-12}$ aryl group and most preferably a $C_{6-10}$ aryl group. Most preferably, at least one silane monomer comprising at least one phenyl group as an aryl group is used in the reaction.

The at least one aryl group, which is preferably bonded directly to a silicon atom of one of the silane monomers, may be an unsubstituted aryl group, such as the aforementioned phenyl group, or a substituted aryl group. In the latter case, the at least one aryl group may for example be substituted with at least one functional group which is selected from the group consisting of linear alkyl functional groups, branched alkyl functional groups, cyclic alkyl functional groups, linear alkenyl functional groups, branched alkenyl functional groups, cyclic alkenyl functional groups, linear alkynyl functional groups, branched alkynyl functional groups, cyclic alkynyl functional groups and any desired combinations of two or more of the aforementioned functional groups. The aforementioned substituents may comprise for example 1 to 25 carbon atoms, preferably 1 to 15 carbon atoms, particularly preferably 1 to 10 carbon atoms, more preferably 1 to 6 carbon atoms and most preferably 1 to 4 carbon atoms.

Merely by way of example, methyl functional groups, ethyl functional groups, n-propyl functional groups, isopropyl functional groups, n-butyl functional groups, sec-butyl functional groups, isobutyl functional groups, tert-butyl functional groups, vinyl functional groups, n-propenyl functional groups, isopropenyl functional groups, linear butenyl functional groups, branched butenyl functional groups, ethynyl functional groups, propynyl functional groups and butynyl functional groups may be mentioned as suitable substituents, and may be used alone or in any desired combination with one another. Methyl functional groups, ethyl functional groups, n-propyl functional groups, isopropyl functional groups, n-butyl functional groups, sec-butyl functional groups, isobutyl functional groups, tert-butyl functional groups and any desired combinations of two or more of the aforementioned functional groups are particularly preferred as a substituent, if one is used.

Although it is possible to use substituted aryl groups, according to the present invention it is particularly preferred to use unsubstituted aryl groups, such as in particular phenyl groups.

Following the inventive idea, it is proposed for the at least one alkyl group which is contained in the at least two silane monomers as a structural unit, and which is preferably bonded directly to a silicon atom of one of the silane monomers, to be a $C_{1-25}$ alkyl group, preferably a $C_{1-15}$ alkyl group, more preferably a $C_{1-10}$ alkyl group, even more preferably a $C_{1-6}$ alkyl group, particularly preferably a $C_{1-4}$ alkyl group and most preferably a $C_{1-3}$ alkyl group. The aforementioned alkyl groups may be cyclic, branched or linear alkyl groups, it being preferred for the at least one alkyl group to be linear. For example, the at least one alkyl group may be a methyl group, ethyl group, n-propyl group, isopropyl group, n-butyl group, sec-butyl group, isobutyl group, tert-butyl group, n-pentyl group, branched pentyl group, cyclopentyl group, n-hexyl group, branched hexyl group, cyclohexyl group or any desired combination of two or more of the aforementioned groups.

Particularly good results are achieved if the at least one alkyl group contained as a structural unit in the at least two silane monomers is an ethyl group or most preferably a methyl group.

In this case too, it is preferred for the at least one alkyl group provided as a structural unit in the at least two silane monomers to be unsubstituted.

Alternatively, it is also possible to use substituted alkyl groups, it being possible to use all functional groups known for this purpose to the person skilled in the art as a substituent. Merely by way of example, the substituents selected from the group consisting of hydroxy groups, ether groups, amino groups, halogens and any desired combinations of two or more of the aforementioned functional groups may be mentioned as possible substituents in this context.

The present invention is also not particularly limited with regard to the chemical nature of the at least one alkenyl group used as a structural unit, which is preferably bonded directly to a silicon atom of one of the silane monomers. For example, the at least one alkenyl group may be any desired cyclic, branched or linear $C_{2-25}$ alkenyl group, good results being achieved in particular with a $C_{2-15}$ alkenyl group, more preferably with a $C_{2-10}$ alkenyl group, particularly preferably with a $C_{2-6}$ alkenyl group and more preferably with a $C_{2-4}$ alkenyl group. Most preferably, the at least one alkenyl group is a vinyl group.

All of the aforementioned alkenyl groups may be substituted or unsubstituted, it being possible to use all the examples mentioned above in relation to the alkyl groups and aryl groups as substituents. If substituted alkenyl groups are used, it is preferred for the at least one alkenyl group to be substituted with a $C_{1-25}$ alkyl functional group, more preferably with a $C_{1-15}$ alkyl functional group, even more preferably with a $C_{1-10}$ alkyl functional group, particularly preferably with a $C_{1-6}$ alkyl functional group and most preferably with a $C_{1-4}$ alkyl functional group on at least one carbon atom of the double bond. Examples of a corresponding substituent are those selected from the group consisting of methyl functional groups, ethyl functional groups, n-propyl functional groups, isopropyl functional groups, n-butyl functional groups, isobutyl functional groups, sec-butyl functional groups, tert-butyl functional groups and any desired combinations of two or more of the aforementioned alkyl functional groups.

However, it is particularly preferred for the at least one alkenyl group to be unsubstituted, and most preferred for the at least one alkenyl group to be an unsubstituted vinyl group.

The at least three halogen atoms bonded to a silicon atom of one of the silane monomers may be any desired halogen atoms, in other words fluorine, chlorine, bromine or iodine, it being possible for the at least three halogen atoms to be identical or different. For example, a fluorine atom, a bromine atom and an iodine atom may be bonded to a silicon atom of one of the silane monomers. However, it is preferred for three identical halogen atoms to be bonded to a silicon atom of one of the silane monomers, it being particularly preferred for the at least three halogen atoms each to be chlorine.

As described above, it is preferred for unsubstituted groups to be used as structural units. Therefore, in a development of the inventive idea, it is proposed for at least one of the at least one aryl group, the at least one alkyl group and the at least one alkenyl group, preferably at least two of the at least one aryl group, the at least one alkyl group and the at least one alkenyl group, and particularly preferably all three of the at least one aryl group, the at least one alkyl group and the at least one alkenyl group, to be unsubstituted.

In addition to the four aforementioned structural units, in other words in addition to the at least one aryl group, the at least one alkyl group, the at least one alkenyl group and the at least three halogen atoms bonded to a silicon atom of one of the silane monomers, at least one of the silane monomers may optionally comprise one or more hydrogen atoms bonded directly to the silicon atom thereof, in other words at least one SiH group. Preferably, in this embodiment there is only one SiH group in the silane monomers. As a result of the presence of the SiH group(s), the cross-linkability is increased and thus a more highly cross-linked polysilane is obtained.

In a particularly preferred embodiment of the present invention, at least three silane monomers are used in the reaction step, which have the following general formulae (1) to (3):

$R^1SiX_3$, (1)

$R^2R^3SiX_2$ and (2)

$R^4R^5SiX_2$, (3)

in which:

$R^1$ is an aryl group, $R^2$ is an alkenyl group, $R^3$, $R^4$, $R^5$, identical or different, are each an alkyl group or H, with the proviso that at least one of $R^3$, $R^4$ or $R^5$ is an alkyl group and X is a halogen atom in each case.

The groups set out in detail in the above embodiments may be used as the groups stated in the above formulae, in other words aryl groups, alkenyl groups, alkyl groups and halogen atoms. Accordingly, all halogen atoms may be used as the halogen atoms, it being possible for the individual halogen atoms to be identical or different. Preferably, all of the halogen atoms are chlorine atoms. The aryl group $R^1$ may accordingly in particular be all substituted and unsubstituted $C_{4-25}$ aryl groups, preferably $C_{6-18}$ aryl groups, more preferably $C_{6-14}$ aryl groups, particularly preferably $C_{6-12}$ aryl groups and most preferably $C_{6-10}$ aryl groups. Preferably, the aryl group $R^1$ is an unsubstituted aryl group, and most preferably a phenyl group. The alkenyl group $R^2$ may accordingly in particular be all substituted and unsubstituted, cyclic, branched and linear $C_{2-25}$ alkenyl groups, preferably $C_{2-15}$ alkenyl groups, more preferably $C_{2-10}$ alkenyl groups, particularly preferably $C_{2-6}$ alkenyl groups and most preferably $C_{2-4}$ alkenyl groups. Preferably, the alkenyl group $R^2$ is an unsubstituted, linear alkenyl group, and most preferably a vinyl group. The alkyl groups $R^3$, $R^4$ and $R^5$ may accordingly in particular be all substituted and unsubstituted, cyclic, branched and linear $C_{1-25}$ alkyl groups, preferably $C_{1-15}$ alkyl groups, more preferably $C_{1-10}$ alkyl groups, even more preferably $C_{1-6}$ alkyl groups, particularly preferably $C_{1-4}$ alkyl groups and most preferably $C_{1-3}$ alkyl groups. Preferably, the alkyl groups $R^3$, $R^4$ and $R^5$ are an unsubstituted, linear alkyl group, particularly preferably an ethyl group and most preferably a methyl group.

Particularly good results are achieved in the above embodiment, in particular if the individual functional groups in the general formulae (1) to (3) are as follows:
$R^1$ is a phenyl group,
$R^2$ is a vinyl group,
each of $R^3$, $R^4$, $R^5$, identical or different, is an alkyl group or H, with the proviso that at least one of $R^3$, $R^4$ and $R^5$ is an alkyl group, and
X is a chlorine atom in each case.

In the above embodiment preferably $C_{1-22}$ alkyl groups, in particular $C_{1-12}$ alkyl groups, more preferably $C_{1-6}$ alkyl groups, even more preferably $C_{1-4}$ alkyl groups, particularly preferably $C_{1-3}$ alkyl groups, particularly preferably $C_{1-2}$ alkyl groups and most preferably methyl groups are used as the alkyl groups $R^3$, $R^4$ and $R^5$. It is therefore particularly preferred for the individual functional groups in the general formulae (1) to (3) to be as follows:
$R^1$ is a phenyl group,
$R^2$ is a vinyl group, and
each of $R^3$, $R^4$, $R^5$, identical or different, is a $C_{1-22}$ alkyl group, preferably a $C_{1-12}$ alkyl group, more preferably a $C_{1-6}$ alkyl group, even more preferably a $C_{1-4}$ alkyl group, particularly preferably a $C_{1-3}$ alkyl group, particularly preferably a $C_{1-2}$ alkyl group, and most preferably a methyl group, and X is a chlorine atom in each case.

According to a particularly preferred embodiment of the present invention, phenyltrichlorosilane, dichloromethylvinylsilane and dichlorodimethylsilane are used as silane monomers in the reaction step, in other words three silane monomers of general formulae (1) to (3):

$R^1SiX_3$, $R^2R^3SiX_2$, and $R^4R^5SiX_2$, in which:
$R^1$ is a phenyl group,
$R^2$ is a vinyl group,
$R^3$, $R^4$, $R^5$ are each a methyl group, and
X is a chlorine atom in each case.

The above three silane monomers may be used alone or optionally together with one or more additional silane monomers. However, with a view to achieving good workability of the polysilane produced therefrom and achieving an at least virtually stoichiometric silicon-carbon ratio after the pyrolysis of the polysilane produced therefrom, it is preferred for only the three aforementioned silane monomers, in other words phenyltrichlorosilane, dichloromethylvinylsilane and dichlorodimethylsilane, to be used as silane monomers in the reaction.

In principle, the individual silane monomers can be used in any desired ratio to one another in the reaction. In the above embodiments, in which at least three silane monomers having general formulae (1) to (3) are used, it is preferred, with a view to achieving good workability of the polysilane produced therefrom and achieving an at least virtually stoichiometric silicon-carbon ratio after the pyrolysis of the polysilane produced therefrom, for the substance proportion of the silane monomer having general formula (1) to be 15 to 30 mol. %, for the substance proportion of the silane monomer having general formula (2) to be 5 to 40 mol. %, and for the substance proportion of the silane monomer having general formula (3) to be 30 to 80 mol. %, preferably 43 to 66 mol. %, based on the total of these three substances in the reaction. If at least one of the silane monomers contains at least one SiH group, the proportion of this silane monomer is preferably 10 to 40 mol. %.

Particularly good workability and in particular spinnability of the produced polysilane and a silicon-carbon ratio particularly close to 1 after the pyrolysis of the polysilane produced therefrom are surprisingly achieved if, in the above embodiments in which at least three silane monomers having general formulae (1) to (3) are used, the substance proportion of the silane monomer having general formula (1) is 16 to 20 mol. %, the substance proportion of the silane monomer having general formula (2) is 25 to 30 mol. %, and the substance proportion of the silane monomer having general formula (3) is 53 to 59 mol. % based on the total of these three substances in the reaction. If at least one of the silane monomers contains at least one SiH group, the proportion of this silane monomer is preferably 25 to 30 mol. %.

The person skilled in the art knows the appropriate reaction temperatures for the Wurtz coupling for there to be a sufficiently high reaction speed. However, for the above reasons, specifically so as to achieve a particularly homogeneous dispersion of alkali metal in the solvent containing the silane monomers, it is preferred for the reaction to be carried out at a temperature at which the alkali metal is in the form of a melt. The reaction temperature is therefore preferably at least 97.7° C. for sodium, and preferably at least 63.4° C. for potassium. If a mixture or alloy of sodium and potassium is used, the reaction temperature can be reduced accordingly as a result of the reduction in melting point. Depending on the specific alkali metal used, the reaction step may therefore take place at a temperature of 0 to 200° C., preferably 20 to 180° C., more preferably 60 to 160° C., particularly preferably 80 to 160° C., particularly preferably 90 to 140° C. and most preferably 98 to 130° C.

To suppress secondary reactions and in particular oxidation reactions in so far as possible, in a development of the inventive idea it is proposed to carry out the reaction in an inert gas such as nitrogen or argon.

It is further preferred for the stirring speed during the reaction step to be at least 50 rpm, preferably between 150 and 300 rpm. A lower stirring speed leads to the formation of a bimodal molecular weight distribution having an undesirably high proportion of oligomers.

After the reaction, the undissolved components, which among other things contain unreacted alkali metal, are separated out by filtration, in such a way that the target polysilane is obtained in the filtrate and can be isolated therefrom by evaporating the solvent.

The polysilane is filtered, for example to remove the resulting salts, the insoluble silane and the excess alkali metal which is subsequently to be deactivated, preferably at temperatures higher than 30° C., particularly preferably at 50 to 75° C. Filtration at higher temperatures increases the yield of polysilane.

The present patent application further relates to a polysilane obtainable by the above-described method. A polysilane of this type is distinguished by a comparatively high molar mass, and is additionally surprisingly pyrolysable to form silicon carbide having a virtually stoichiometric silicon-carbon ratio.

The polysilane according to the invention preferably has a molecular weight of at least 5,000 Da, more preferably at least 7,500 Da and even more preferably at least 10,000 Da.

According to the present invention, molecular weight is determined by gel permeation chromatography, specifically in accordance with DIN 55672. Because of the high molecular weight thereof, it is possible to obtain a material which is solid at room temperature and which can be spun excellently to form fibers.

According to a preferred embodiment of the present invention, the polysilane according to the invention, calculating on the basis that the total of the following groups in the polysilane is 100%, contains 40 to 85%, particularly preferably 50 to 80% and most preferably 60 to 70% alkyl groups, 5 to 30%, more preferably 10 to 20% and particularly preferably 10 to 15% alkenyl groups, 5 to 30%, particularly preferably 10 to 25% and most preferably 15 to 20% aryl groups, and 0.1 to 10%, particularly preferably 0.2 to 5% hydrogen atoms.

Since, as described above in relation to the method, the alkyl groups are preferably methyl groups, the alkenyl groups are preferably vinyl groups and the aryl groups are preferably phenyl groups, it is particularly preferred for the polysilane according to the invention, calculating on the basis that the total of the following groups in the polysilane is 100%, to contain 40 to 85%, particularly preferably 50 to 80% and most preferably 60 to 70% methyl groups, 5 to 30%, more preferably 10 to 20% and particularly preferably 10 to 15% vinyl groups, 5 to 30%, particularly preferably 10 to 25% and most preferably 15 to 20% phenyl groups, and 0.1 to 10%, particularly preferably 0.2 to 5% hydrogen atoms. As described in the previous paragraph, these numerical values are based on the total of the aforementioned substituents being 100%. These numbers thus represent the molar ratio of the substances to one another. These proportions of aryl groups, alkyl groups, alkenyl groups and hydrogen atoms in the polysilane according to the invention can easily be determined by $^1$H-NMR spectroscopy, for example.

The polysilane according to the invention has a viscosity of 1,500 to 3,000 Pa s at 100° C.; values of 1,800 to 2,400 Pa s at 100° C. are preferred, particularly preferably 1,900 to 2,200 Pa s at 100° C. As a result of the viscosity in this range of values, the polysilane is particularly suitable for use in melt spinning at this temperature. If the polysilanes are to be processed at a different temperature, the softening temperature should be influenced by way of adapted synthesis conditions. A lower molar mass of the polysilane in turn leads to a reduction in the softening temperature or the melt viscosity.

The polysilane according to the invention may be processed to form fibers by melt spinning or dry spinning. Using the polysilane according to the invention, even fibers having thin diameters can be produced in this manner. Because of the flexibility thereof, the fibers produced in accordance with the invention are excellent for processing. The number of breaks during fiber production is greatly reduced, and the yield of fibers and the length thereof are greatly increased. Not only can fibers having diameters known from the art having a diameter of 10 to 100 µm be produced, but fibers having smaller diameters can also be obtained. The use of thin nozzles in the spinning process leads to thin ceramic fibers, but the production thereof is also detracted from by high break rates of the fibers. Surprisingly, it has been found that for spun fiber diameters of 5 to 10 µm the break rates can be greatly reduced when the polysilane according to the invention is used in the spinning process.

The present invention therefore also contains polysilane fibers which have been produced by melt spinning or by dry spinning.

The polysilane fibers produced in accordance with the invention have a diameter of preferably 1 to 100 µm, particularly preferably 5 to 50 µm, more preferably 8 to 35 µm and most preferably 10 to 25 µm. Thin fibers are particularly attractive for the production of ceramics in electrical engineering, semiconductor technology, medical technology and space travel.

Preferably, the distribution of the fiber diameters in the polysilane fibers produced in accordance with the invention has a standard deviation between 5 and 15%, preferably 5 and 8%, of the average fiber diameter. The distribution of the fiber diameters is thus very homogeneous, and this can qualitatively improve the production of ceramics or fiber composite materials.

Preferably, after the fiber spinning, the polysilane fibers produced in accordance with the invention are treated by chemical or physical curing, for example thermal curing treatments, radiation curing or reaction with curing media (for example gases or vapors). The curing may for example be carried out using UV light and/or temperature treatment, which may be part of the pyrolysis.

Preferably, the fibers produced in accordance with the invention which are cured if necessary may be pyrolysed and processed to form ceramic fibers.

Therefore, the present invention relates to silicon carbide fibers which have been processed from the polysilane fibers produced according to the invention by pyrolysis to form ceramic fibers.

Since, as described above, the polysilane fibers according to the invention have very thin diameters and a very homogeneous diameter distribution, the silicon carbide fibers according to the invention also have very thin diameters and a homogeneous diameter distribution. Therefore, the silicon carbide fibers according to the invention are high-quality and excellent for processing to form fiber composite materials and ceramics.

In principle, the pyrolysis may be carried out in all manners known to the person skilled in the art and using any temperature profile. However, good results are achieved in particular if the pyrolysis takes place with exclusion of oxygen, in other words in an inert gas atmosphere such as nitrogen, in such a way that the maximum temperature is 400 to 1,800° C., preferably 600 to 1,200° C. and particularly preferably 800 to 1,000° C. In the pyrolysis, the heating rate is to be set to a value between 0.1 and 200 K/min, preferably between 0.5 and 50 K/min, particularly preferably between 0.75 and 10 K/min and most preferably to a value of approximately 1.0 K/min. The conversion of the polysilane to the silicon carbide is completed at 400 to 800° C.

However, treatment at a higher temperature is necessary to achieve the desired microstructure formation.

Preferably, the silicon carbide fiber has a crystallization level of 20 to 80%, particularly preferably 40 to 70% and most preferably 50 to 60%. However, it is also possible for the silicon carbide fiber to be completely amorphous or completely crystalline, and so crystallization levels of 0 to 100% are possible according to the invention.

According to a further preferred embodiment of the present invention, the particle size of the silicon carbide of the silicon carbide fiber is in a range of 0 to 20 µm, preferably 0.01 to 15 µm, particularly preferably 0.03 to 10 µm, particularly preferably 0.05 to 5 µm and most preferably 0.1 to 2 µm.

Finally, as is known in principle, a sizing may be applied to the silicon carbide fiber.

As described above, the silicon carbide of the silicon carbide fibers according to the invention is distinguished by a virtually stoichiometric silicon-carbon ratio, in other words by a low content of free carbon.

Preferably, the silicon carbide fiber is characterized in that the ratio of the amounts of silicon and carbon in the silicon carbide is preferably 0.75 to 1.25, more preferably 0.8 to 1.20, particularly preferably 0.85 to 1.15, particularly preferably 0.9 to 1.0 and most preferably 0.95 to 1.0.

According to the present invention, the substance ratio of silicon and carbon is determined by elemental analysis. According to the present invention, the carbon content is determined by combusting a sample and analyzing the combustion gases by infrared absorption. The sample for analysis is heated inductively to temperatures between 1,250° C. and 1,400° C. in a high-frequency furnace and combusted by supplying oxygen, the resulting $CO_2$ being passed through an infrared cell. The amount can be determined from the strength of the absorption of the associated bands. The oxygen content is also determined by combusting a sample and analyzing the combustion gases by infrared absorption. In this case helium is used as a carrier gas. The sample for analysis is heated inductively to temperatures between 1,250° C. and 1,400° C. in a high-frequency furnace, the oxygen contained in the sample interacting with the graphite crucible in which the sample is located, and the resulting $CO_2$ and CO being passed through an infrared cell. The amount can be determined from the strength of the absorption of the associated bands. Since there are no further elements in the sample, the silicon content can be found by taking the difference of the previously obtained carbon and oxygen values from 100%.

Further, the fibers produced in accordance with the invention may be used in a fiber composite material, characterized in that it comprises a silicon carbide fiber according to the invention and a matrix material.

Likewise, the polymer fibers produced in accordance with the invention may be used in a fiber composite material, characterized in that it contains a polysilane fiber according to the invention and a matrix material. Optionally, the polysilane fiber is converted into a ceramic fiber by treating the composite material.

The fibers or the matrix may be composed of the silicon carbide according to the invention. Further possible substance systems for the fibers or matrix are SiCN, SiBNC, $Al_2O_3$, $SiO_2$, $TiO_2$, $ZrO_2$ and mixtures thereof, it being preferred for both the fibers and the matrix to be composed of silicon carbide.

Further, the polymer or ceramic fibers may be in the form of non-crimp fabrics, fiber mats, woven fabrics, warp-knitted fabrics, weft-knitted fabrics, non-wovens and/or felts, non-crimp fabrics and/or fiber mats being preferred.

To produce the composite material according to the invention, fiber structures containing silicon carbide fibers produced as above (or other ceramic fibers) may be impregnated with the polysilane described according to the invention (or other polymer precursors) and subsequently pyrolysed as described above. Optionally, curing may be carried out between the impregnation and the pyrolysis, it being possible for example for the curing to be carried out using UV light and/or by a temperature treatment. Subsequently, the bodies produced in this manner may be impregnated with polysilane one or more times, cured and pyrolysed.

Further, the described polysilane may be applied to any desired fibers as a melt or solution, and provides protection, for example oxidation protection, after the pyrolysis.

Because of the outstanding properties thereof, in particular the outstanding high-temperature resistance and high hardness thereof, the polysilane according to the invention, the silicon carbide fibers and produced silicon carbide molded bodies according to the invention and the silicon-carbide-containing fiber composite materials according to the invention, molded bodies and/or fiber composite material according to the invention are particularly suitable for applications in which the material is exposed to high temperatures and oxidative conditions, specifically for example in lightweight construction, in the electrical industry, in space travel, in motor vehicle construction and in aircraft construction. Because of the more cost-effective production method of the present invention, in particular the use of the molded body and/or fiber composite material according to the invention as a material for clutch discs or brake discs is preferred.

EXAMPLES

In the following, the present invention is described by way of practical examples, which illustrate but do not limit the present invention.

In particular, the yield and the molecular weight of the practical examples are compared with a comparative example from the prior art. The results are summarized in Table 1. In Table 1, Mn represents the number-average molecular weight of the produced polysilanes in daltons, Mw represents the weight-average molecular weight of the produced polysilanes, and Mp represents the molecular weight of the highest peak of the chromatogram, all specified molecular weights being determined experimentally by gel permeation chromatography. For carrying out the gel permeation chromatography, a "PL-GPC 50Plus" GPC system from Polymer Laboratories is used along with THF eluent, PL-Gel Mixed-C separating columns and refractive index detectors. The evaluation took place using Cirrus GPC Version 3.1 software and conventional calibration using polystyrene standards.

Other features which are considered as characteristic for the invention are set forth in the appended claims.

Although the invention is illustrated and described herein as embodied in a high-molecular polysilane and a method for the production thereof for producing pre-ceramic molded bodies, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
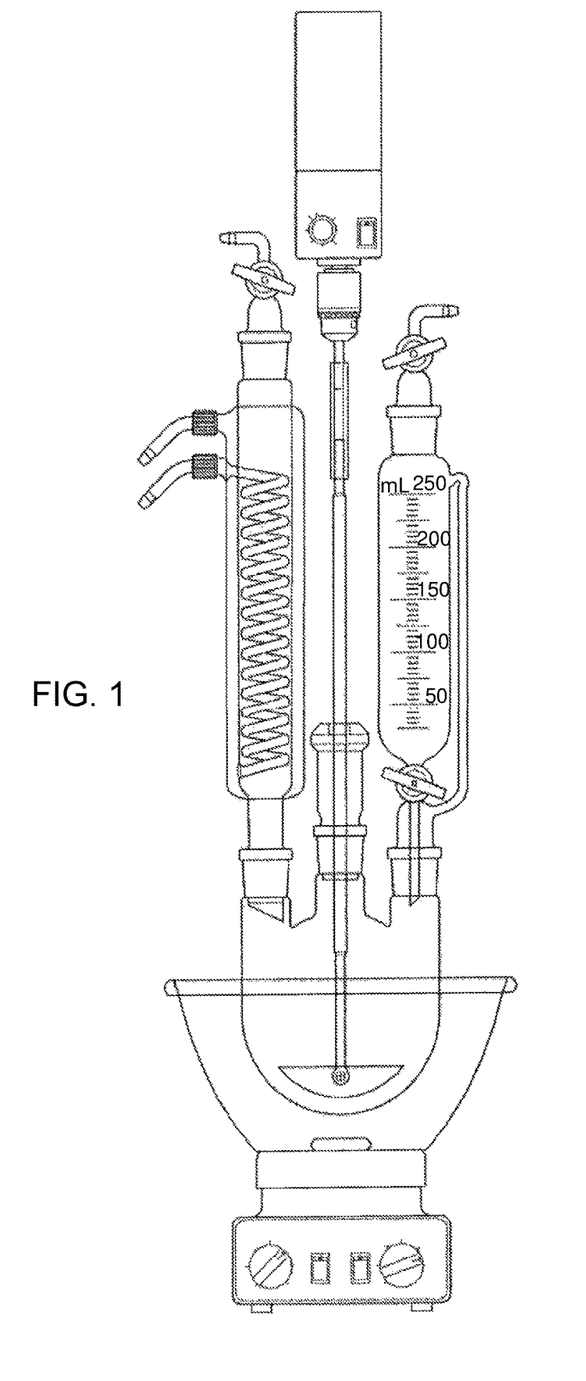
FIG. 1 is an illustration of a test setup for synthesizing the polysilane according to the invention.

Referring now to the figures of the drawings in detail and first, particularly to FIG. 1 thereof, there is shown an illustration of a test setup for synthesizing the polysilane. A reflux cooler, a mechanical stirrer and a 500 ml dropping funnel are attached to a 2-liter three-necked flask.

Figure 2:
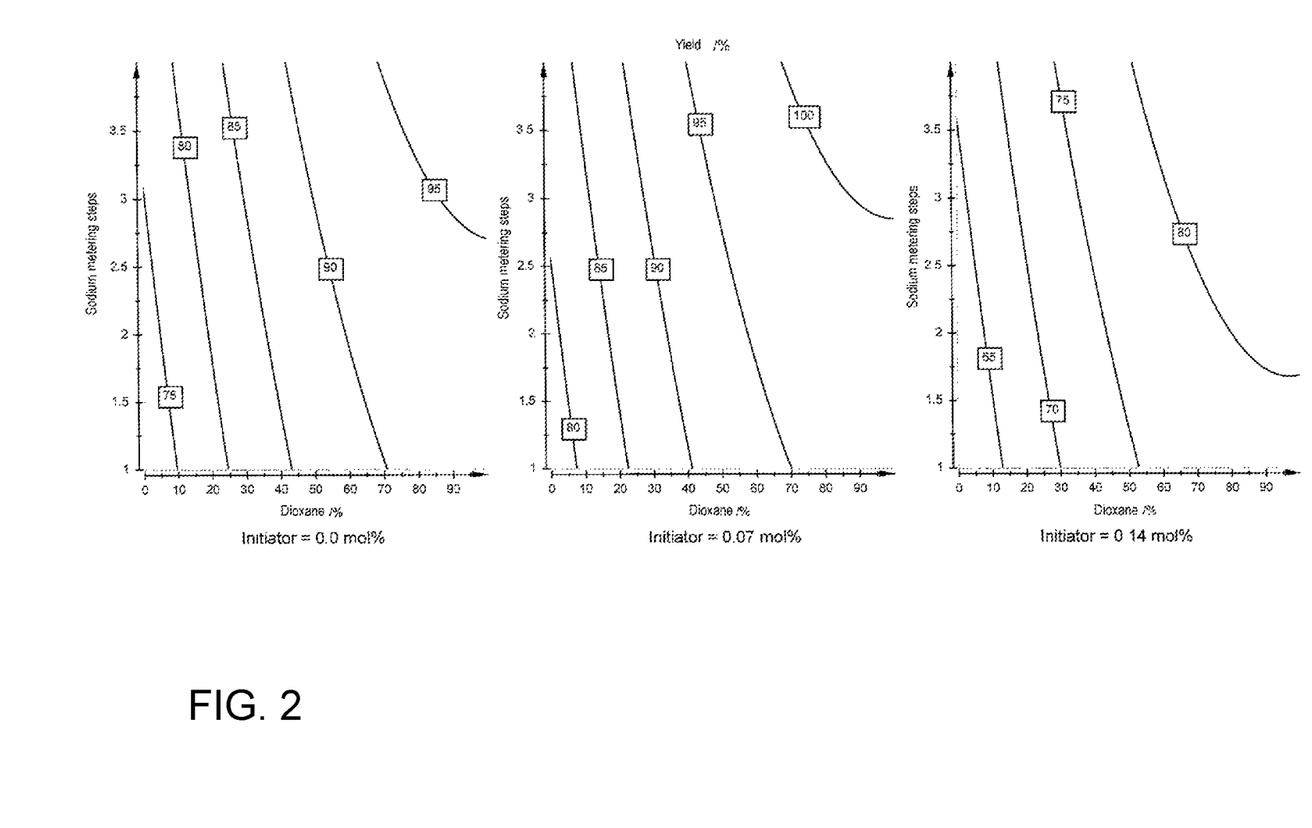
FIG. 2 is a graph showing the result of a statistical test planning analysis, and describes the influence of dioxane, of an initiator and of the number of steps of sodium metering on the percentage polysilane yield.

FIG. 2 is a graph showing the result of a statistical test planning analysis, and describes the influence of dioxane, of an initiator and of the number of steps of sodium metering on the percentage polysilane yield. It can be seen that higher yields are achieved for a higher concentration of dioxane as a solvent. The highest yield is achieved with a 100% dioxane concentration. Likewise, the metering of the sodium should take place in as many steps as possible. As a result of the use of an initiator at an amount of 0.07 mol. %, the yield can also be increased, and so for the correct combination of reaction parameters a quantitatively high yield can be achieved.

Figure 3:
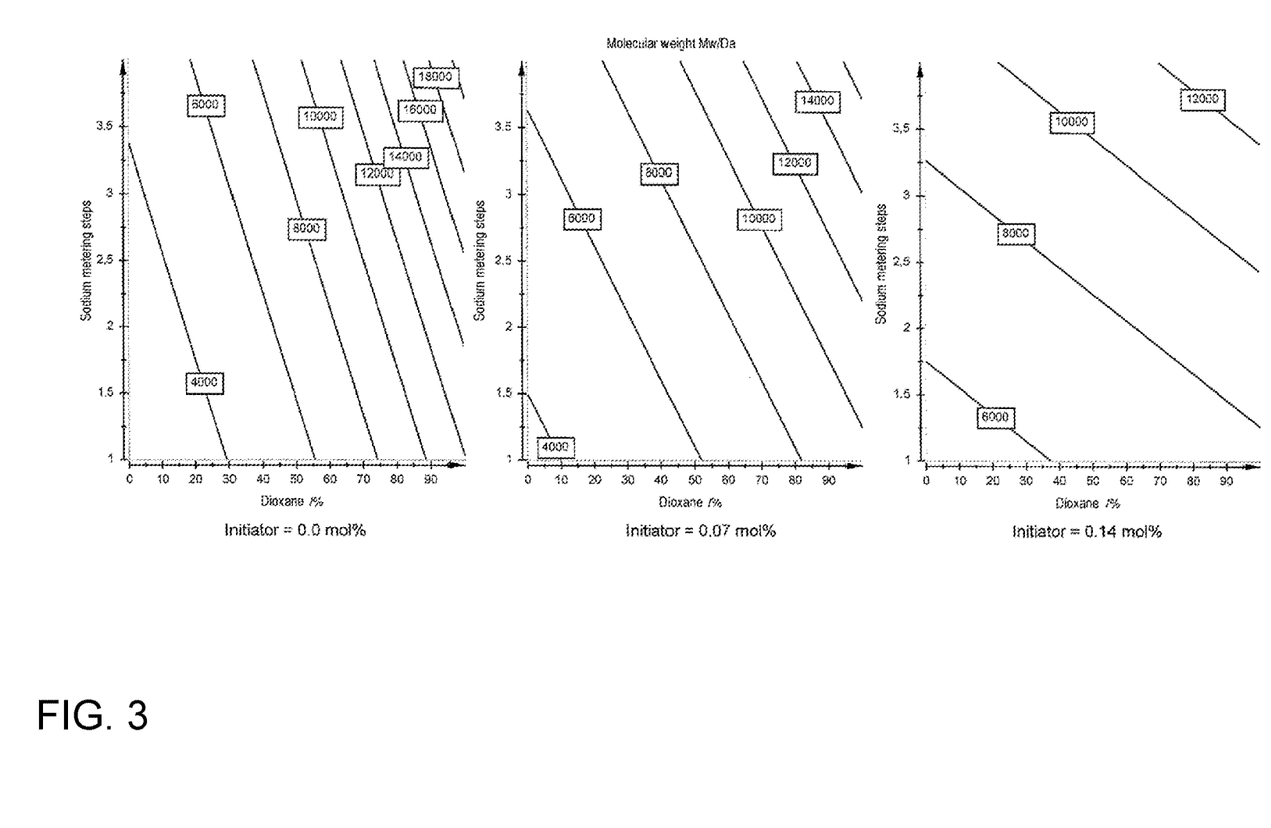
FIG. 3 is a graph showing the result of the statistical test planning analysis, and describes the influence of dioxane, of an initiator and of the number of steps of sodium metering on the molecular weight of the polysilane in daltons.

FIG. 3 shows graphically the result of a statistical test planning analysis, and describes the influence of dioxane, of an initiator and of the number of steps of sodium metering on the molecular weight of the polysilane in daltons. Both dioxane as a solvent, preferably high-concentration or pure dioxane, and step-by-step metering of the sodium lead to an increase in the molecular weight. The weight-average molecular weight was measured by gel permeation chromatography. The use of an initiator can have a positive effect on the molecular weight, but should not exceed 0.14 mol. %.

Thus, FIGS. 2 and 3 demonstrate the effects according to the invention of increasing the yield and molecular weight as a function of the solvent dioxane, the initiator and the step-by-step metering of the sodium.

A comparative example and a plurality of practical examples are described in the following, and experimentally demonstrate the stated effects of increasing the yield and molecular weight of the polysilane.

Comparative Example

The comparative example is produced by the following protocol. The solvent mixture of 610 ml toluene and 102 ml tetrahydrofuran is added in protective gas in a 2 L three-necked flask, has 112.37 g sodium added at room temperature, and is subsequently heated to 102° C. The boiling point of the mixture can be set using the ratio of the solvents. The synthesis is carried out under reflux throughout (T ≈102° C.). The KPG stirrer used is operated at a speed of 250 rpm to obtain a homogeneous sodium suspension. The provided mixture of 57 ml phenyltrichlorosilane, 76 ml dichloromethylvinylsilane and 152 ml dichlorodimethylsilane is dripped into the sodium suspension over 40 minutes. The calculated drip rate was 7.1 ml/min. Once the monosilane mixture has been supplied, the reaction is stirred for 2 hours under reflux. After cooling to room temperature, the suspension obtained is filtered under a protective gas (10 μm frit). The filtrate obtained is concentrated to a concentration of 65% by weight polysilane. The total yield of soluble polysilane is 80%. The weight-average molecular weight determined by gel permeation chromatography is 6111 Da.

Practical Example 1

The production takes place using standard Schlenk technology in an apparatus shown in FIG. 1. 1078 ml dioxane and 15.1 g sodium are provided in the three-necked flask in argon. In the dropping funnel, there is a mixture of 29.3 ml phenyltrichlorosilane, 40.2 ml dichloromethylvinylsilane and 74 ml dichloromethylsilane. The solvent is heated until boiling, establishing a temperature of 101° C. The stirrer is set to a speed of 250 rpm, in such a way that a uniform dispersion of the solvent mixture and the molten sodium can occur. Initially, 0.11 g chlorotriphenylsilane (0.035 mol. %) are added, a slight blue coloration being observed. After one minute, the mixture of the chloromonosilanes is added at a drip rate of 5.7 ml/min (at least 5.5 ml/min). The reaction onset is indicated by the blue coloration of the preparation. After six minutes, the dropping is interrupted and a further 15.1 g sodium are added, followed by 0.11 g chlorotriphenylsilane. Subsequently, another quarter of the monosilanes are dropped in at the specified rate. This rhythm is continued until the silane mixture is fully consumed. The addition is complete after 25 min; during this time, the temperature remains constant at 101° C. Subsequently, the solution is boiled for 2 hours under reflux. After cooling, the suspension is filtered using a protective gas frit, which has a pore size of 10 μm. A mixture of sodium chloride, unreacted sodium and a small portion of polysilane which is insoluble in the solvent used are left as a residue. The residue is suspended in 160 ml iso-propanol and the sodium is deactivated by adding methanol step by step. The solvent along with the polysilane dissolved therein is contained in the filtrate. After the solvent is removed by distillation, the polysilane is obtained as a fine-powdered mass in a yield of 85%. The weight-average molecular weight of the polysilane, determined by gel permeation chromatography, is 14,124 Da. The viscosity at 100° C. is 2,200 Pa s. The measurements were taken on a Physica MCR 301 rotation rheometer from Anton Parr. The measurements were taken using a plate/plate geometry with approximately 300-500 mg of the respective sample.

The composition of the polysilane product is determined by proton NMR spectroscopy. The proton NMR spectra were recorded using a 250 MHz spectrometer from Bruker Biopsin GmbH in deuterated dioxane or benzene. The evaluation took place using MestReNova LITE Version 5.2.5 software; the respective solvent was used as an internal standard.

In this example, the proportion of alkyl functional groups is 66.7%, the proportion of alkenyl groups is 12.7%, the proportion of aryl groups is 20.3% and the proportion of hydrogen atoms is 1%. The method according to practical example 1 leads to a higher molecular weight of the polysilane and to a higher yield than the comparative example, which demonstrates the prior art.

Practical Example 2

In practical example 2, the reaction was carried out as in practical example 1, except that the entire amount of sodium is already provided at the start and no initiator is added. At 98%, the yield is greatly increased. The molecular weight Mw of the polysilane is 11950 Da and is thus greatly increased from the prior art. By comparison with practical example 1, it is found that step-by-step addition of sodium and/or the addition of an initiator can increase the molecular weight of the polysilane.

Practical Example 3

In practical example 3, the reaction is carried out as in practical example 1, except that the entire amount of sodium and the entire amount of initiator are already provided at the start. At 95%, the yield is greatly increased from the prior art, as is the molecular weight Mw of the polysilane of 11,398 Da. Accordingly, it is advantageous to add the sodium and/or the initiator step by step. In this example, the proportion of alkyl functional groups determined by NMR spectroscopy (carried out as in example 1) is 68.9%, the proportion of alkenyl groups is 14.3%, the proportion of aryl groups is 16.8% and the proportion of hydrogen atoms is 1.1%

Practical Example 4

In practical example 4, the reaction is carried out as in practical example 1, except that no initiator is added. The yield is very good at 91%, and the molecular weight Mw of the polysilane of 8,710 Da is also greatly increased from the comparative example. However, by comparison with practical example 1, practical example 4 shows that the addition of an initiator greatly increases the molecular weight Mw of the polysilane. In this embodiment, the ratio of silicon to carbon is 0.788. The ratio is determined by elemental analysis. For this purpose, the oxygen and carbon content of the sample are measured and the silicon proportion is calculated from the remainder to 100%. To measure the carbon proportion, the sample is filled into a zinc capsule and completely oxidized in an oxygen-containing atmosphere. The reaction gases are separated out by gas chromatography and quantitatively determined by thermal conduction measurement. The oxygen is determined analogously using helium as a carrier gas; the oxygen in the sample reacts with the graphite crucible used, and the resulting $CO_2$ is detected. The above analysis methods correspond in principle to the conventional measurement devices for elemental analysis.

Practical Example 5

In practical example 5, the reaction is carried out as in practical example 1, except that the sodium and the initiator are added in two steps. The yield is very good at 92%. The weight-average molecular weight is also increased from the prior art at 6832.5 Da. While at 982 Da the number-average molecular weight Mn is increased from practical example 3 (955 Da) and the prior art (844 Da), the weight-average molecular weight Mw at 6832.5 is reduced from practical example 3, and this shows that adding sodium in two steps does lead to an increased overall degree of polymerization, but the number of molecules of very high molecular weight is lower than in practical example 3. In this example, the proportion of alkyl functional groups determined by NMR spectroscopy (carried out as in practical example 1) is 67.4%, the proportion of alkenyl groups is 14.6%, the proportion of aryl groups is 17.9% and the proportion of hydrogen atoms is 3.2%

Practical Example 6

In practical example 5, the reaction is carried out as in practical example 1, except that 50% of the dioxane was replaced with a toluene tetrahydrofuran mixture in a 6 to 1 ratio. The molecular weight obtained is only 4,900 Da, and this shows the influence of the dioxane. Nevertheless, the number-average molar mass Mn can be increased from the prior art, and this shows that overall a very high degree of polymerization is achieved, but many polysilane molecules have a comparatively low molecular weight. The distribution of the molecular weights is thus more homogeneous.

TABLE 1

| Example | Mn (Da) | Mw (Da) | Mp (Da) | Yield [%] |
|---|---|---|---|---|
| Comparison | 844 | 6111 | 1285 | 80 |
| 1 | 1100 | 14124 | 3107 | 85 |
| 2 | 1182 | 11950 | 3326 | 98 |
| 3 | 955 | 11389 | 3017 | 95 |
| 4 | 1092 | 8710 | 2377 | 91 |
| 5 | 982 | 6832.5 | 2929 | 92 |
| 6 | 1145 | 4900 | 1843 | 84 |

Practical Example 7: Processing by Melt Spinning

The polysilane according to the invention is filled as a fine granulate into a laboratory spinning system and heated to 100° C. in a vacuum. Once this temperature is reached, the polymer is conveyed through a spinning nozzle by applying a 4 bar nitrogen pressure and drawn off at a rotation speed of 100-200 rpm. As a result of the drafting, fibers having a diameter of 37 to 87 μm are obtained, for example.

Practical Example 8: Processing by Dry Spinning

The polysilane produced in accordance with the invention is processed by dry spinning to form green fibers. For this purpose, the polysilane is dissolved in toluene, THF or dioxane and conveyed through the spinning nozzle using a pump. As a result of stretching, fibers having a diameter of 51 μm may be obtained, for example.

Practical Example 9: Further Processing by Curing

The green fibers obtained are irradiated with 500 W ultraviolet light in UV chamber for 2 times 5 minute. The thermoplastic fibers are thus converted to insoluble, infusible fibers.

Practical Example 10: Pyrolysis

The cured fibers are pyrolysed at 1200° C. in a protective gas atmosphere. This results in ceramic silicon carbide fibers having for example a diameter of 37 μm.

Practical Example 11: Matrix Polymer by Melt Infiltration

From the polymer produced in accordance with the invention, prepregs are produced by the known method of melt infiltration. These are thermally cured and pyrolysed in protective gas conditions. The fiber composite material containing ceramic matrix has for example a fiber proportion of 73%.

The invention claimed is:

1. A method for producing a polysilane, which comprises the steps of:
reacting (i) at least two silane monomers and (ii) at least one alkali metal in an ether-containing solvent, the silane monomers containing the following structural units:
at least one aryl group;
at least one alkyl group;
at least one alkenyl group; and
at least three halogen atoms, at least three of the halogen atoms being bonded to a silicon atom of one of the silane monomers; and
using a reaction initiator during the reacting step, the reaction initiator containing the following structural units:
a silicon atom;
at least one halogen atom bonded to the silicon atom; and
at least two sterically hindering groups bonded to the silicon atom.

2. The method according to claim 1, wherein ether of the ether-containing solvent contains at least two oxygen atoms.

3. The method according to claim 1, wherein the ether-containing solvent contains 50 to 100% dioxane.

4. The method according to claim 1, which further comprises using the alkali metal in an excess of at least 10% with respect to an amount of halogen in educts.

5. The method according to claim 1, which further comprises adding the alkali metal step by step in parallel with an addition of the silane monomers to a reaction mixture.

6. The method according to claim 1, which further comprises adding 0.01 to 0.25 mol. % of the reaction initiator to the alkali metal dispersion prior to an addition of remaining silane monomers.

7. The method according to claim 1, wherein the ether-containing solvent contains 100% dioxane.

8. The method according to claim 1, which further comprises using the alkali metal in a range of 10 to 20% with respect to an amount of halogen in educts.

9. The method according to claim 1, which further comprises adding the alkali metal in at least 4 steps in parallel with an addition of the silane monomers to a reaction mixture.

10. The method according to claim 1, which further comprises adding 0.06 to 0.1 mol. % of the reaction initiator to the alkali metal dispersion prior to an addition of remaining silane monomers.

\* \* \* \* \*